L. M. Wright,
Water Wheel.
No. 112,202. Patented Feb. 28, 1871.

L. M. Wright,
Water Wheel.

No. 112,202.  Patented Feb. 28, 1871.

United States Patent Office.

LARNARD M. WRIGHT, OF FORT EDWARD, NEW YORK.

Letters Patent No. 112,202, dated February 28, 1871.

IMPROVEMENT IN WATER-WHEELS.

The Schedule referred to in these Letters Patent and making part of the same.

I, LARNARD M. WRIGHT, of Fort Edward, county of Washington and State of New York, have invented certain Improvements in Water-Wheels, of which the following is a specification.

The nature of my invention is the constructing a turbine water-wheel without a gate and still having all the benefits of a gate; and also the substitute for a gate, which is the disk of the wheel, being completely balanced by water-pressure, and thus requiring only a small amount of power to open or close the gate or let on or shut off the water.

Description of Accompanying Drawing.

Figure 1:
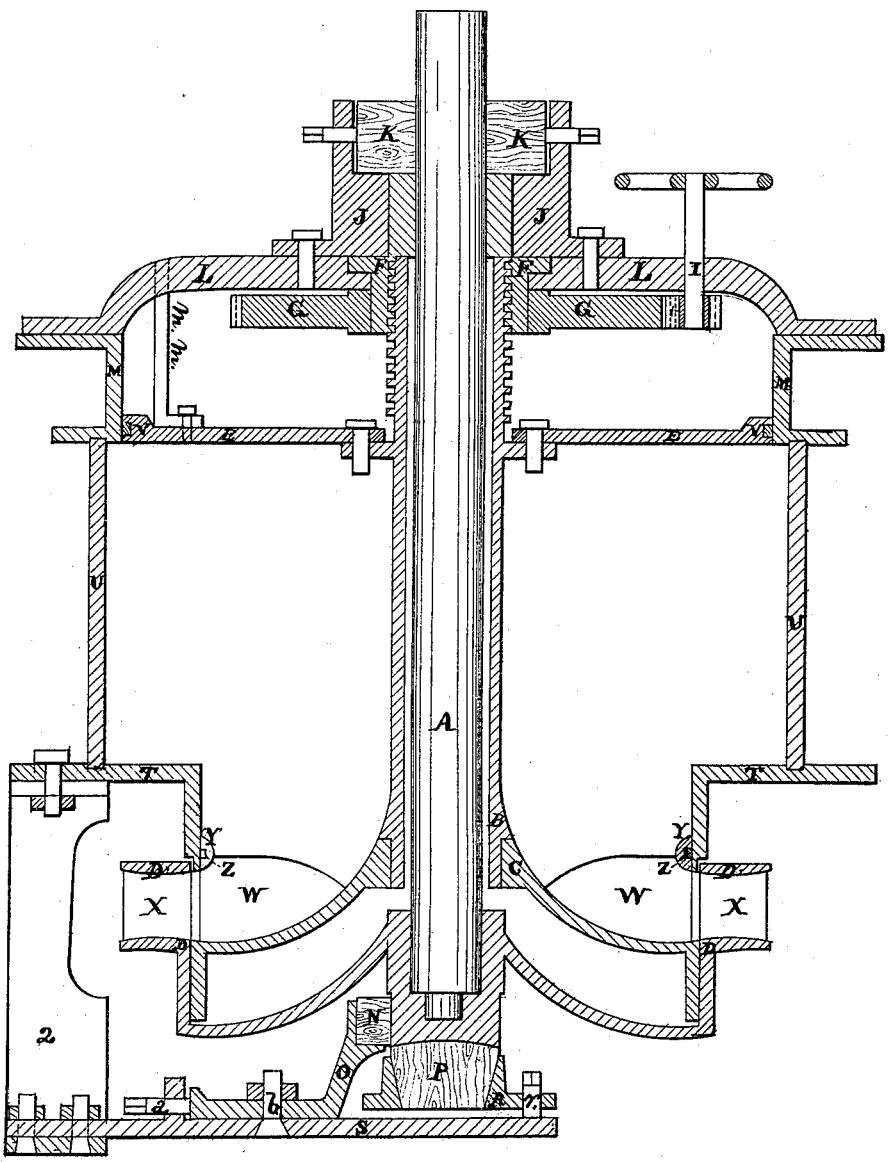
Figure 1 is an elevation through the axis of a wheel embracing my invention.
Figure 2:
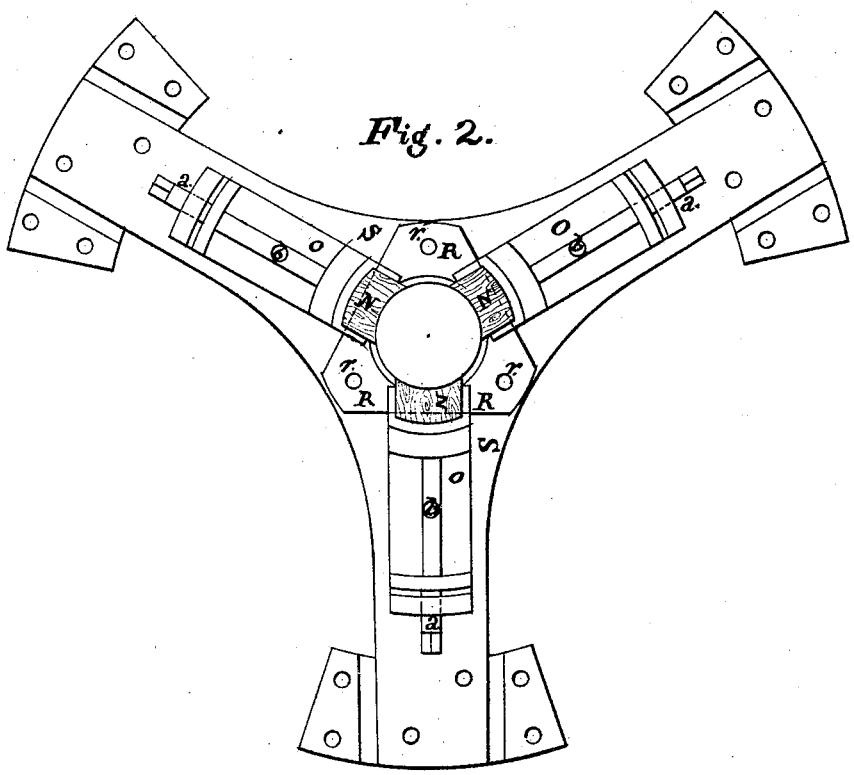
Figure 2 is a plan for the lower step.
Figure 3:
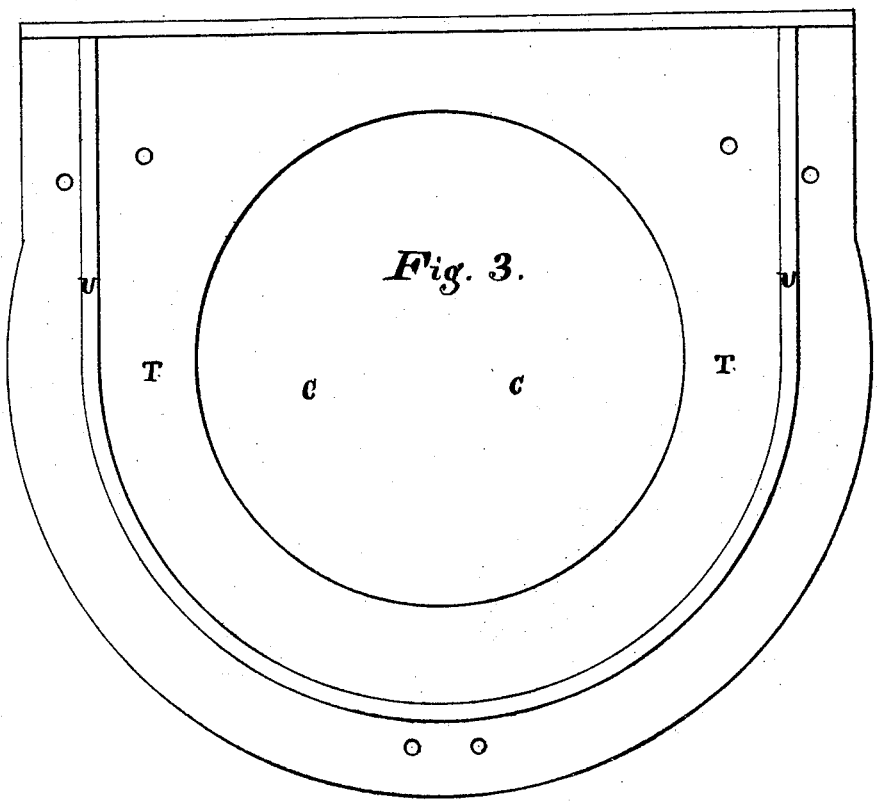
Figure 3 shows the lower part of the reservoir.
Figure 5:
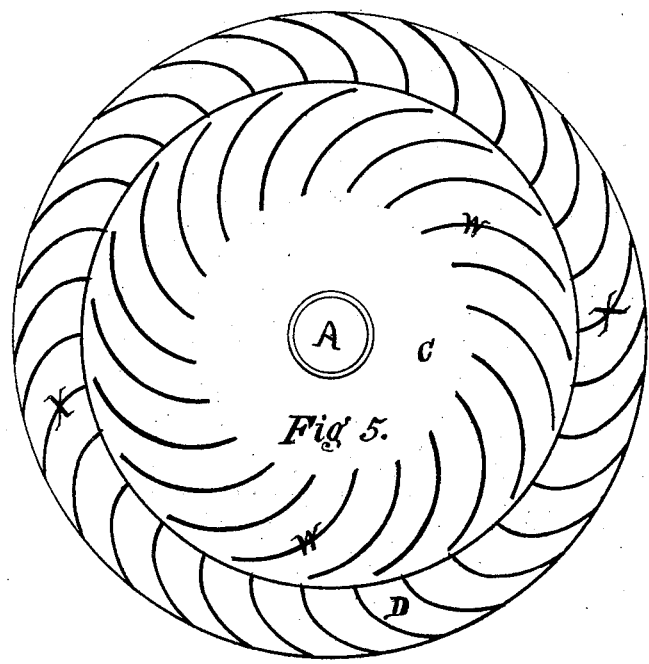
Figure 5 is a plan of the buckets and guide-curves.
Figure 4:
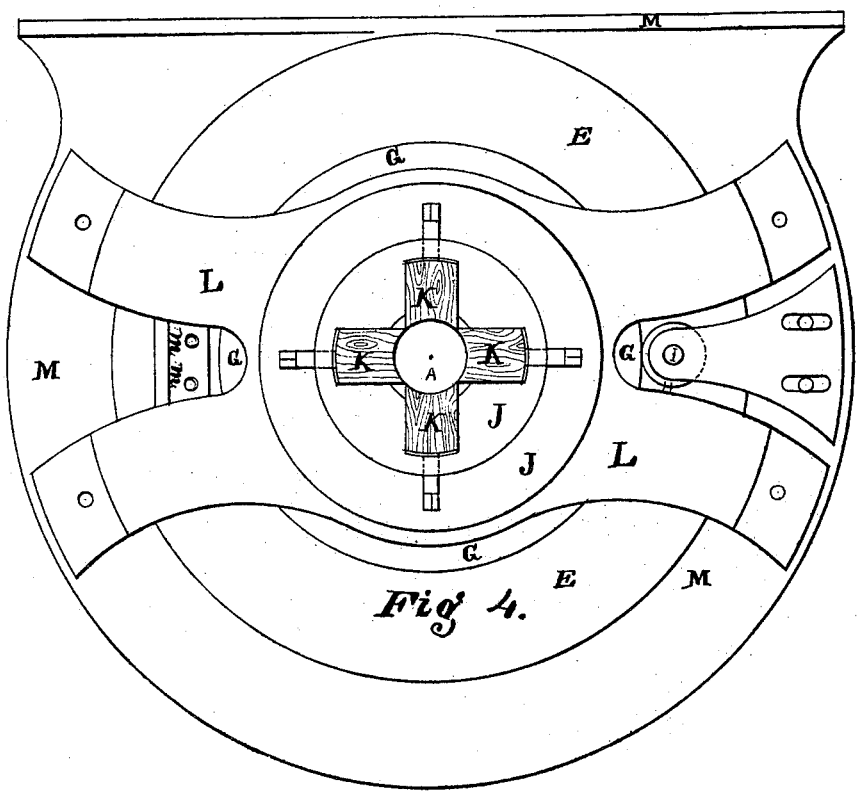
Figure 4 shows top of reservoir and box for top of shaft, and apparatus for moving gate to let on or shut off water.

General Description.

A is the shaft of the wheel.

B is the pipe surrounding the shaft.

C is the disk of the wheel, attached to the pipe by a screw or by bolts.

W are the guide-curves, firmly attached to the disk.

Y is a concentric ring attached to the upper edges of the guide-curves.

E is a circular plate bolted to the flange on the pipe B.

D is the bed-plate of the wheel, with its hub fitted to the shaft A and its lower crown of the wheel, into which the lower edges of the buckets X are set.

D' is the upper crown of the wheel, into which the upper edges of the buckets X are set.

F is an internal screw fitted to an external screw on the upper end of the pipe B, held in place by J and L, and is made to revolve by the cog-wheel G.

G is a cog-wheel fitted to the internal screw F.

H is a pinion, working with the cog-wheel G.

I is a shaft for the pinion H, the shaft having a hand-wheel on the upper end.

J is the upper journal-box for the shaft A, with its boxes K K K K.

L is a cross-head or beam.

M is the upper part of the reservoir or flume, having a circular opening close-fitted to the plate E, and to which the cross-head L is bolted.

N N N are boxes of hard wood or metal, fitted to and held by the adjustable holders O O O.

P is a hard-wood step, held by the adjustable plate R.

S is the bed-plate or spider on which the whole wheel rests.

Q Q Q are posts connecting the lower spider S with the lower plate of the reservoir or flume T.

U is the sides of the reservoir or flume.

Operation.

The pipe B, circular plate E, and disk C, with its guide-curves W and concentric ring Y, being all connected, and forming one piece, and depending on the internal screw F for their position, may be moved so that the disk at its outer diameter on its upper surface may be on a plane with the lower crown D of the bed-plate of the wheel on its upper side, or may be moved in like manner by turning the wheel G in the opposite direction, so that the same place on the disk may be on a plane with the lower side of the upper crown D', which position will bring the disk to touch the lower edge of the concentric flange on T, which will prevent the passage of water through the wheel, thus forming a perfect gate by moving the parts of the wheel described, as held in position by F, so as to open or close the passage for water.

The circular plate E is of a larger diameter than the disk, sufficient to balance, by the additional upward pressure of water, the weight of water in the reservoir, and the weight of the pipe B and the disk C with their attachments.

The circular plate E, which is held from revolving by the plate M M, is fitted with water-tight packing at V V.

By thus dispensing with a gate, the outer diameter of the guide-curves W can be nearly as large in diameter as the inside edges of the buckets X, thus delivering the water direct from the guide-curves to the buckets without passing a wide space, having no guide curves to direct it, as must always be the case when there is a gate between them. Therefore this mode of construction gives a higher percentage of efficiency.

The projecting cylindrical part of the disk C, which, when the water-passage is widest, is within and closely fitting the cylindrical part of the bed-plate D, serves to prevent the water from taking any other course except that of passing directly through the wheel when the water-passage is partially open.

The plate R is for holding the step P, and for setting the wheel higher or lower by the set-screws $r\ r\ r$, as may be required from time to time.

The plates or holders O O O are for adjusting the wheel laterally, and when moved by the set-screws $a\ a\ a$, and when set in the right position, are securely clamped and held by the bolts $b\ b\ b$.

Claim.

I claim as my invention—

1. The combination of the pipe B with the circular plate E, so as to make the upward pressure of water on the plate E equal to the pressure downward on the disk, added to the weight of the pipe B, disk C, plate E, and their attachments, which are moved by the screw F.

2. The combination of the cross-head L with the internal screw F and the upper box J, as and for the purposes set forth.

3. The arrangement of the boxes P and N N N with the holders R and O, as and for the purpose described.

4. The cylindrical part of the disk on its outer diameter, and fitting within the bed plate D, as and for the purposes described.

L. M. WRIGHT.

Witnesses:
　A. M. CLEMENTS,
　J. K. PIXLEY.